United States Patent [19]

Tihanyi et al.

[11] 3,994,846
[45] Nov. 30, 1976

[54] POLYETHYLENE CONTAINING DIPHENYL THIOUREA THERMAL STABILIZERS

[75] Inventors: Béla Tihanyi; Arnolt Gerlicher, both of Oberhausen, Germany

[73] Assignee: Ruhrchemie Aktiengesellschaft, Oberhausen-Holten, Germany

[22] Filed: Jan. 26, 1976

[21] Appl. No.: 652,210

[30] Foreign Application Priority Data

Feb. 1, 1975   Germany............................ 2504178

[52] U.S. Cl..................... 260/23 H; 260/28.5 D; 260/45.9 NC
[51] Int. Cl.² ........................................ C08K 5/36
[58] Field of Search...... 260/45.9 NC, 23 H, 28.5 D

[56] References Cited
UNITED STATES PATENTS

| 2,651,620 | 9/1953 | Hill et al. | 260/45.9 NC |
| 2,651,621 | 9/1953 | Hill et al. | 260/45.9 NC |
| 2,651,622 | 9/1953 | Hill et al. | 260/45.9 NC |
| 2,651,667 | 9/1953 | Hill et al. | 260/45.9 NC |
| 2,960,488 | 11/1960 | Tamblyn et al. | 260/45.9 NC |
| 3,238,176 | 3/1966 | Brooks et al. | 260/45.9 NC |
| 3,651,623 | 9/1953 | Hill et al. | 260/45.9 NC |

Primary Examiner—V.P. Hoke
Attorney, Agent, or Firm—Bierman & Bierman

[57] ABSTRACT

A thermoplastic moulding material utilizing Polyethylene having a molecular weight above 1,000,000 is provided. Moulding properties are improved by adding to the polymerizate a diphenylthiourea of the general formula:

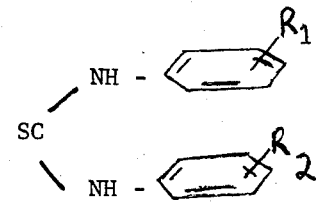

where $R_1$ and $R_2$ are selected from the group consisting of hydrogen, alkyl groups with 1 to 8 carbon atoms and alkoxy groups with 1 to 4 carbon atoms. $R_1$ and $R_2$ may be the same or different. Lubricants may also be added to the polymerizate.

7 Claims, No Drawings

POLYETHYLENE CONTAINING DIPHENYL THIOUREA THERMAL STABILIZERS

This invention relates to thermoplastic moulding materials based on polyethylene with molecular weights above 1,000,000. The materials are stabilized with regard to heat-and light-degradation and exhibit improved extrusion properties.

With an increasing degree of polymerization of polyethylene, a number of technically important properties are considerably improved. The impact strength increases, the tensile strength at raised temperatures improves and the resistance to corrosion due to stress is greater. Polyethylene with high molecular weights is thus employed as special material in each case where the low molecular weight types do not fullfil the requirements. This has been especially true in, among others, the textile industry, e.g. in the manufacture of loom-pickers, in mechanical engineering, in rollerforms, cable-guide rollers, slides, anti-friction strips, for wall linings in mining, and for the manufacture of insulating parts and in orthopedics.

The preparation of high molecular weight polyethylene is known. It takes place when ethylene is polymerized at low pressure using Ziegler- or chromium oxide catalysts.

High molecular weight polyethylene, like all polymers, is chemically modified by heat and light as well as by the oxidation effects connected with them. These alterations — they lead to a noticeable deterioration in the mechanical properties of the material — occur for example during manufacture in presses and in extruders, which, because of the thermal properties of high molecular weight polyethylene, must take place at relatively high temperatures.

The effect on high molecular weight polymers due to heat, light and oxidation can be wholly or partly prevented by suitable stabilization methods. The most common method employed is the admixing of stabilizers to the polymerizate.

The stabilization must be sufficient to protect the high molecular weight polyethylene from heat, light and oxidation effects during the normally slow cooling process, or during thermal aftertreatment, and, of course, later as finished product e.g. in the form of cog wheels, cable-guide rollers, insulator parts, etc.

The following compounds, for example, have proved to be effective — alone or in combination — for the stabilization of low and medium molecular weight polyethylene: 4,4'-thiobis-(3-methyl-6-tert. butylphenol-1), dilauryl-thiodipropionate, distearyl-thio-dipropionate, tetrakis-[methylen(3,5-ditert.-butyl-4-hydroxy-hydrocinnamate)]-methane, n-octadecyl-B-(4'-hydroxy-3,5'-ditert. butylphenyl)-propionate, bis-[3,3-bis(hydroxy-3'-tert. butylphenyl)-butanoic acid]-glycolester.

The synthetic thermoplastic materials are provided with a lubricant in order to improve the flow properties and to reduce wall friction. For example, metal soaps, such as zinc-and calcium stearate, higher fatty alcohols, fatty acid glycerin esters and waxes are used for this purpose.

It was found that even the stabilizers usually employed with polyolefins, as well as the lubricants alone or as a combination lubricant/stabilizer, are not adequate to stabilize and improve the flow properties of high molecular weight polyethylene. High molecular weight polyethylene batches along with the above named stabilizers and lubricants, for example, in extrusion to form strands, tend to form strong tears and, in many cases, even to lead to surface ruptures. Such products cannot be used for further processing.

It has surprisingly been found that the above disadvantages of thermoplastic moulding material based on polyethylene having a molecular weight above 1,000,000 can be overcome when 0.05 to 1.0 % by weight (relative to the total weight of the moulding material) of a diphenylthiourea is added to the polymerizate prior to moulding or extrusion, said urea having the general formula:

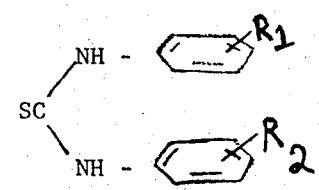

wherein $R_1$ and $R_2$ are the same or different, and respresent hydrogen, alkyl groups with 1 to 8 carbon atoms, and alkyloxy groups with 1 to 4 carbon atoms. If necessary, the usual lubricants can be used to improve flow properties.

Moulding materials with 0.05 to 0.2 % by weight of diphenylthioureas have proved to be especially good. Greater amounts of these compounds improve the workability of the higher molecular weight polyethylene only to a limited extent, and in some cases, can detrimentally affect the good color quality of the product. For example, Diphenylthiourea, N,N'-bis(2-methylphenyl)-thiourea, N,N'-bis(2-ethylphenyl)-thiourea and N,N'-bis(4-ethoxyphenyl-thiourea are employed successfully.

The diphenylthioureas are prepared conventionally by reacting carbondisulfide with the corresponding aniline compound (cf. e.g. Houben-Weyl, Methoden der Organischen Chemie, Vol. 9, p. 884). Diphenylthiourea is indeed already known as a heat stabilizer for polyvinyl chloride and as a vulcanisation accelerator for rubber. However, it was not foreseeable, that this substance would also act as a stabilizer for high molecular weight polyethylene and, furthermore, would markedly improve its extrusion properties.

The diphenylthioureas can be added along with the usual lubricants such as e.g. Ca-stearate, Zn-stearate, waxes etc. It has been found to be advantageous to employ the lubricants at a concentration of 0.05 to 1 % by weight relative to the total weight of the moulding material.

The preparation of the new polyethylene materials takes place by homogeneous mixing of the powdery polymerizate with the equally powdery diphenylthiourea and, if necessary, lubricants, as well as further stabilizers. After mixing, thermal treatment can take place.

The materials, in accordance with the invention, can be further processed in the usual manner such as by extrusion to profiles, such as strands from which many types of formed parts can be made, such as discs, cog wheels and other items having different shapes.

The invention is illustrated in an exemplary manner by the following examples. Examples 1 to 4 describe the polyethylene materials in accordance with invention. Comparative examples are presented in Examples 5 to 8.

EXAMPLE 1

Powdery polyethylene with molecular weight above 1 million is homogeneously mixed with 0.1 part Ca-stearate and 0.1 part diphenylthiourea, extruded using a conventional double screw extruder to form separate strands having diameters of 60 to 90 mm. respectively. The profile is tempered by slow cooling in order to reduce internal stress. The surface of the extruded material is smooth and free from shrinkage cavities and elevations. Strands prepared in this manner are not discolored and are suitable for further processing.

EXAMPLE 2

Powdery polyethylene with molecular weight above 1 million is homogeneously mixed with 0.1 part Ca-stearate and 0.1 part N,N'-Bis(2-ethylphenyl)thiourea and extruded, with a double screw extruder, to strands of 60 mm diameter. The profile is tempered by slow cooling in order to reduce internal stress. The surface of the extruded material is smooth and the strand prepared is free from shrinkage cavities and is not discolored.

EXAMPLE 3

Powdery polyethylene with molecular weight above 1 million is homogenesly mixed with 0.1 part Ca-stearate and 0.1 part N,N'-Bis(2-octylphenyl)-thiourea and extruded, with a double screw extruder, to strands with diameters of 60 and 90 mm, respectively. The profile is tempered by slow cooling in order to reduce internal stress. The surface of the extruded material is smooth and free from shrinkage cavities and elevations. Strands prepared in this manner are not discolored and are suitable for further processing.

EXAMPLE 4

Powdery polyethylene with molecular weight above 1 million is homogeneously mixed with 0.1 part Ca-stearate and 0.1 part N,N-Bis(4-ethoxyphenyl)-thiourea and extruded with double worms to compeletely round rods with diameters of 60 and 90 mm. respectively. The profile is tempered by slow cooling in order to reduce internal stress. The surface of the extruded material is smooth and free from shrinkage cavities and elevations. Strands prepared in this manner are not discolored and are suitable for further processing.

EXAMPLE 5

The extrusion conditions correspond to those in example 1. High molecular weight polyethylene (molecular weight in excess of one million) is mixed with 0.1 part Ca-stearate and 0.1 part 4,4'-thiobis-(3-methyl-6-tert. butylphenol-1) and extruded to strands. The sample is strongly yellow colored. The strand surface contains cracks which are a few millimeters to a centimeter long. In many places there are higher elevations and readily noticeable shrinkage cavities.

EXAMPLE 6

The extrusion conditions correspond to these of the previously named example. High molecular weight polyethylene having a molecular weight in excess of one million, is mixed with 0.1 part tetrakis [methylen(3,5-ditert.-butyl-4-hydroxy-hydrocinnamate)]methane and extruded to strands. The surface of the extruded material exhibits the same faults as the strands in example 5. The product is thus not suitable for further processing.

EXAMPLE 7

The extrusion conditions correspond to those in example 1. n-octadecyl-B-(4'-hydroxy-3,5'-ditert.butylphenyl)propionate is used as a stabilizer and inserted in the same concentration as in the previous experiments (0.1 parts) to the high molecular weight polyethylene. The surface of the extruded material is likewise cracked and the color of the strand unsatisfactory.

EXAMPLE 8

The same conditions for extrusion are used as in example 1. 0.1 part Ca-stearate and 0.1 part distearylthio-dipropionate are added to the high molecular weight polyethylene as supplementary materials. The extruded material is strongly colored and the surface cracked. The strand is not suitable for further processing.

In all of the preceding examples, the conditions of the extruder, and any pre-treatment of the moulding material, is conventional and the same as for polyethylene alone.

Modifications may be made in and to the invention described above by those of ordinary skill in the art. It is intended to cover all such modifications which fall within the spirit and scope of the invention as defined by the claims appended hereto.

What is claimed is:

1. Thermolastic moulding materials, comprising polyethylene with molecular weight above 1,000,000 and 0.05 to 1.0 % by weight, relative to the total weight of the moulding material, of a diphenylthiourea of the general formula:

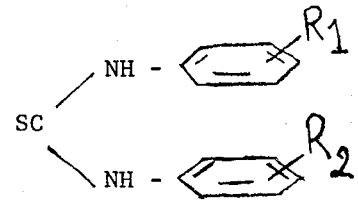

in which $R_1$ and $R_2$ are selected from the group consisting of hydrogen, alkyl groups with 1 to 8 carbon atoms, and alkoxy groups with 1 to 4 carbon atoms.

2. The moulding materials according to claim 1 further comprising a lubricant.

3. The moulding materials according to claim 1 wherein said diphenylthiourea is N,N'-bis(2-ethylphenyl)thiourea.

4. The moulding materials according to claim 1 characterised by the fact that they contain approximately 0.05 to 0.2 % by weight of said diphenylthiourea.

5. The moulding materials according to claim 2 wherein said lubricant consists of a compound selected from the group consisting of Ca-stearate, Zn-stearate, waxes, higher fatty alcohols and fatty acid glycerin esters.

6. The moulding material according to claim 1 wherein R and $R_2$ are the same.

7. The moulding material according to claim 1 wherein R and $R_2$ are different.

* * * * *